United States Patent [19]

Yagi

[11] Patent Number: 4,760,450
[45] Date of Patent: Jul. 26, 1988

[54] LIMITER CIRCUIT FOR PREVENTING BLOOMING IN A VIDEO DISPLAY TERMINAL

[75] Inventor: Yasuo Yagi, Tokyo, Japan

[73] Assignee: Pioneer Electronic Corporation, Tokyo, Japan

[21] Appl. No.: 892,823

[22] Filed: Aug. 4, 1986

[30] Foreign Application Priority Data

Aug. 6, 1985 [JP] Japan .......................... 60-120332[U]

[51] Int. Cl.⁴ ......................... H04N 5/52; H04N 5/57
[52] U.S. Cl. ..................................... 358/170; 358/169
[58] Field of Search ............... 358/170, 168, 169, 166; 330/273, 296

[56] References Cited

U.S. PATENT DOCUMENTS

| | | | |
|---|---|---|---|
| 3,205,446 | 9/1965 | Altemus | 358/170 |
| 3,980,815 | 9/1976 | Kaneko | 358/170 |

FOREIGN PATENT DOCUMENTS

| | | | |
|---|---|---|---|
| 68774 | 5/1980 | Japan | 358/170 |
| 93376 | 7/1980 | Japan | 358/170 |
| 978199 | 12/1964 | United Kingdom | 358/170 |

*Primary Examiner*—Tommy P. Chin
*Attorney, Agent, or Firm*—Finnegan, Henderson, Farabow, Garrett & Dunner

[57] ABSTRACT

A limiter circuit for video display terminal which produces contrast voltage comprises an amplifier for amplifying video signals received from a source thereof, and a series of transistors receiving the video signal from the amplifier, arranged for selectively limiting the occurrence of blooming on the display terminal in response to the value of the contrast voltage of the terminal.

6 Claims, 2 Drawing Sheets

LIMITER CIRCUIT FOR PREVENTING BLOOMING IN A VIDEO DISPLAY TERMINAL

BACKGROUND OF THE INVENTION

1. Field of the Invention

The present invention relates to a limiter circuit for clipping a white peak in video signals (picture signals) and preventing an occurrence of blooming on the display surface of Cathode Ray Tube (CRT).

2. Background Art

A conventional limiter circuit for clipping a white peak in video signals is shown in FIG. 1. In this Figure, video signals Y (brightness signals) inputted into the input 4 are amplified in the amplifier 1. The video signals (picture signals) are applied to a base of a transistor $Q_1$, which is one of a pair of differential transistors $Q_1$ and $Q_2$. A reference voltage E is applied to a base of the differential transistor $Q_2$. A fixed voltage $V_{cc}$ is applied to the collectors of both the transistors $Q_1$ and $Q_2$. In accordance with the amplitude of the picture signals Y, the collector current and the emitter current of the transistor $Q_1$ changes. Therefore, a voltage $V_{23}$ between point 2 and point 3 changes due to a voltage drop on the resistance $R_1$. The voltage $V_{23}$ is outputted at an output 5.

In this construction, it is assumed that video signals Y inputted into the input 4 and amplified by the amplifier 1 are as shown in FIG. 2A. In FIG. 2A, reference numeral 11 indicates a black level, 12 indicates a white level and 13 indicates a horizontal synchronizing signal. When the amplitude of the picture signal Y comes into the vicinity of the white level, the collector current of the transistor $Q_1$ is cut off, so that the transistor $Q_1$ is OFF. At this time, the reference voltage E is outputted at the output 5. Therefore, when the picture signals Y shown in FIG. 2A outputted from the amplifier 1 are applied to the base of the transistor $Q_1$, signals Y' are outputted at the output 5, as shown in FIG. 2B. In FIG. 2B, reference numeral 14 indicates a level of the reference voltage E [v].

As described above, according to the conventional limiter circuit, since a picture signal in the vicinity of the white level is clipped, the occurrence of blooming on the display surface of the CRT is prevented, and therefore, the picture quality of the CRT display is improved.

However, the conventional limiter circuit described above has problems, as will be discussed below. In such a conventional limiter circuit, a white peak is always clipped, with no relation to the contrast of the picture on the display surface of the CRT. Therefore, in the case where bright white points are required on the picture, and it is unnecessary to improve the picture quality, bright white points cannot be obtained with the conventional limiter circuit, because of the abovedescribed limitting operation. Particularly, in the case of Projection Television (PJTV), the maximum value of brightness is very important. Therefore, problems are encountered in using a conventional limiter circuit in a Projection-type Television.

Therefore, it is a principal object of the present invention to clip a white peak when a value of contrast of a display device is below a certain predetermined point, but not clip the white peak where the contrast value equals or exceeds the predetermined point. Thus, bright white points may be obtained in the latter case.

Additional objects and advantages will be obvious from the description, or may be learned by practice of the invention.

SUMMARY OF THE INVENTION

To achieve the foregoing objects and advantages, the present invention comprises a limiter circuit for a video display terminal, the terminal producing a contrast voltage. The circuit includes amplifier means for amplifying video signals received from a source thereof; and means connected to the amplifier means for selectively limiting the occurrence of blooming on the display terminal in response to the value of the contrast voltage of the terminal.

Preferably, the limiting means includes clipping means for maintaining the amplitude of the video signals below a specified level when the contrast voltage is below a predetermined value, and override means for bypassing the clipping means when the contrast voltage is equal to or greater than the predetermined value.

It is also preferred that the circuit include condenser means for stabilizing the operation of said limiter circuit.

BRIEF DESCRIPTION OF THE DRAWING

The accompanying drawings, which constitute a part of the specification, illustrate one embodiment of the invention, and, together with the description, serve to disclose the principles of the invention. Of the drawings.

DETAILED DESCRIPTION OF THE PREFERRED EMBODIMENT

Reference will now be made in detail to the presently preferred embodiment of the invention, an example of which is illustrated in the accompanying drawings.

Figure 3:
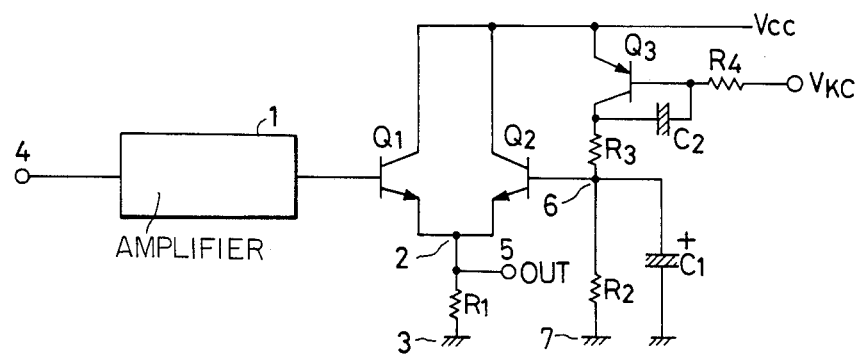
FIG. 3 shows a circuit diagram of a limiter circuit according to a preferred embodiment of the present invention.
Figure 2A:
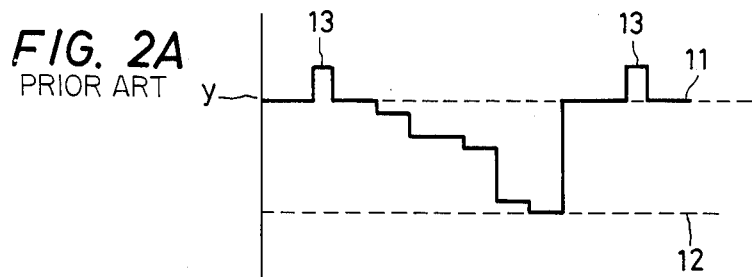
FIG. 2A is a waveform diagram showing one example of picture signals Y applied to the base of the transistor $Q_1$ in the conventional limiter circuit of FIG. 1.
Figure 2B:
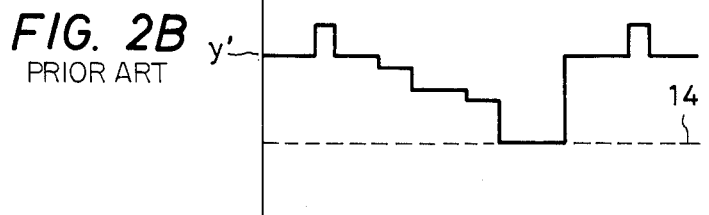
FIG. 2B is a waveform diagram showing picture signals Y' outputted at the output 5 in the limiter circuit of FIG. 1, when the picture signals Y shown in FIG. 2A are applied to the base of the transistor $Q_1$.

FIG. 3 shows a circuit diagram of a limiter circuit according to a preferred embodiment of the present invention. In all Figures, the same or like reference numerals or characters indicate the same or like portions.

According to the embodiment of the present invention, as shown in FIG. 3, a transistor $Q_3$ is connected to a base of the transistor $Q_2$. A resistance $R_2$ and a condenser $C_1$ are connected to the base of the transistor $Q_2$. The resistance $R_2$ and the condenser $C_1$ are in parallel relationship with each other. A contrast control voltage $V_{KC}$ is applied to a base of the transistor $Q_3$. The contrast control voltage $V_{KC}$ is remote-controlled by a computer in a conventional method known to those skilled in the art. The contrast control voltage $V_{KC}$ changes in a range from 3 to 12 [v], in the case where the voltage $V_{cc}$ applied to the collectors of the transistors $Q_1$ and $Q_2$ is 12 [v].

Figure 1:
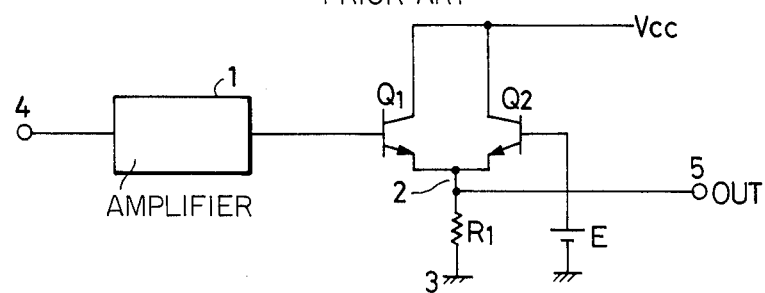
FIG. 1 shows a circuit diagram of a conventional limiter circuit.
Figure 4A:
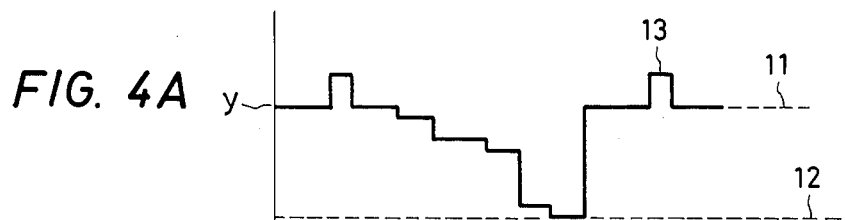
FIG. 4A is a waveform diagram showing one example of picture signals Y applied to the base of the transistor $Q_1$ in the limiter circuit of FIG. 3.
Figure 4B:
FIG. 4B is a waveform diagram showing picture signals Y' outputted at the output 5 in the limiter circuit of FIG. 3, when the picture signals Y shown in FIG. 4A are applied to the base of the transistor $Q_1$, and the value of the contrast of the display surface of the CRT is lower than a predetermined level.

In this construction, it is assumed that video signals Y shown in FIG. 4A appearing at the output of the amplifier 1 are applied to the base of the transistor $Q_1$. (In FIG. 4A, reference numeral 11 indicates a black level, 12 indicates a white level and 13 indicates a horizontal synchronizing signal.) In the case where the contrast control voltage $V_{KC}$ is lower than a predetermined voltage (for example the voltage $V_{cc}$), the transistor $Q_3$ is ON. A voltage $V_{67}$ appears between the points 6 and 7, due to the voltage drop on the resistance $R_2$. The voltage $V_{67}$ is applied to a base of the differential transistor $Q_2$, and the differential transistor $Q_2$ is ON. Therefore, the limiter circuit of FIG. 3 is equal to the circuit of FIG. 1 in function. When a picture signal, an amplitude of which is near the white level, is applied to the base of the transistor $Q_1$, the transistor $Q_1$ is OFF, and a voltage $V_{67}$ is outputted from the output 5. Therefore, when the picture signals Y are applied to the base of the transistor $Q_1$ as shown in FIG. 4A, picture signals Y' are outputted at the output 5, as shown in FIG. 4B. In FIG. 4B, reference numeral 15 indicates a level of the voltage $V_{67}$.

As described above, according to the present invention, in the case where the contrast voltage $V_{KC}$ is lower than the predetermined level, clipping of a white level is achieved, so that occurrence of blooming on the display surface of the CRT is prevented.

Figure 4C:
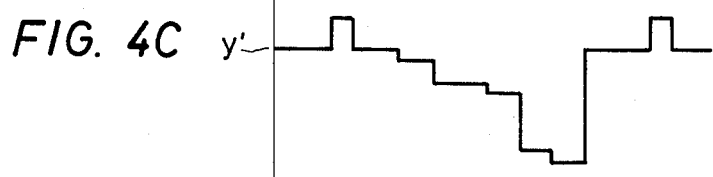
FIG. 4C is a waveform diagram showing picture signals Y' outputted at the output 5 in the limiter circuit of FIG. 3, when the picture signals Y shown in FIG. 4A are applied to the base of the transistor $Q_1$, and the value of the contrast of the display surface of the CRT is equal to or higher than a predetermined level.

On the other hand, according to the present invention, in the case where the contrast control voltage $V_{KC}$ rises and becomes equal to or higher than the predetermined value (for example, the voltage $V_{cc}$), the transistor $Q_3$ becomes OFF. At that point, the transistor $Q_2$ is also in the OFF state. In this case, when picture signals Y shown in FIG. 4A are applied to the base of the transistor $Q_1$, a white peak is not clipped. Therefore, signals Y' are outputted at the output 5, as shown in FIG. 4C.

As described above, according to the present invention, in the case where the contrast control voltage $V_{KC}$ is equal to or higher than a predetermined level, a white peak is not clipped. Therefore, the waveform of the outputted signals Y' is equal to the waveform of the inputted picture signals Y, so that pictures with high brightness are obtainable on the display surface of the CRT.

In FIG. 3, a condenser $C_1$ and a condenser $C_2$ connected to the collector and the base of the transistor $Q_3$ are provided for controlling undesired or unstable action of the limiting operation of the limiter circuit performed when the transistor $Q_3$ turns to the ON or OFF states.

As an example, the limiter circuit of the present invention as shown in FIG. 3 may be constructed, using the following components:

$Q_1$ ... 2SC1740
$Q_2$ ... 2SC1740
$Q_3$ ... 2SA933
$R_1$ ... 680 [Ω]
$R_2$ ... 3.9 [kΩ]
$R_3$ ... 13 [kΩ]
$R_4$ ... 33 [kΩ]
$C_1$ ... 0.01 [μF]
$C_2$ ... 10 [μF]

As described above, according to the present invention, in the case where a contrast level is high, bright white points are obtainable on the display surface of a CRT. In the case where a contrast level is within a normal range, a white peak is limited, and the occurrence of blooming on the display surface is prevented.

Various modifications and variations could be made in the invention without departing from the scope or spirit of the invention.

What is claimed is:

1. A limiter circuit for receiving and controlling video signals for a video display terminal, said video display terminal having means for producing a contrast voltage indicative of overall contrast conditions on the video display terminal, the circuit comprising:
    means for amplifying said video signals; and
    means coupled to said video display terminal and receiving amplified video signals from said amplifying means for selectively limiting occurrence of blooming on said display terminal in response to the contrast voltage of said video display terminal so that blooming selectively occurs according to the overall contrast conditions on the video display terminal.

2. The limiter circuit of claim 1, wherein said limiting means comprises:
    clipping means for maintaining the amplitude of said amplified video signal coupled to said video display terminal below a specified level;
    override means for bypassing said clipping means; and
    means receiving the contrast voltage of said video display terminal for comparing the contrast voltage with a predetermined voltage, said comparing means controlling said override means so that said override means operates when the contrast voltage is equal to or greater than said predetermined value.

3. The limiter circuit of claim 2, also including condenser means coupled to the comparing means for stabilizing the operation of said limiter circuit.

4. The limiter circuit of claim 2 wherein said clipping means includes first and second transistors, said amplified video signals being applied to the base of said first transistor, and a fixed supply voltage being applied to the collectors of both said first and second transistors.

5. The limiter circuit of claim 4 wherein said comparing means includes a third transistor connected to the base of said second transistor, said contrast voltage being applied to a base of said third transistor.

6. The limiter circuit of claim 2, wherein said fixed supply voltage, said specified level and said predetermined voltage are equal.

* * * * *